United States Patent [19]
Tether

[11] Patent Number: 5,863,228
[45] Date of Patent: Jan. 26, 1999

[54] METHOD AND APPARATUS FOR PROPELLING A MARINE VESSEL

[75] Inventor: David Tether, Mechanicsville, Md.

[73] Assignee: Solomon Technologies, Inc., Benedict, Md.

[21] Appl. No.: 639,436

[22] Filed: Apr. 29, 1996

[51] Int. Cl.[6] .................................................. B60L 11/02
[52] U.S. Cl. ..................................... 440/6; 320/18; 440/3
[58] Field of Search .................................. 320/6, 15, 18; 440/3, 6, 8, 9

[56] References Cited

U.S. PATENT DOCUMENTS

| | | | |
|---|---|---|---|
| 1,181,988 | 5/1916 | Breitung | 440/8 |
| 3,643,438 | 2/1972 | Barsby | 60/221 |
| 3,703,642 | 11/1972 | Balaguer | 440/3 |
| 3,918,389 | 11/1975 | Sima | 115/34 B |
| 3,935,833 | 2/1976 | Onal | 115/12 R |
| 3,977,353 | 8/1976 | Toyama | 115/16 |
| 4,553,037 | 11/1985 | Veazey | 440/6 |
| 4,824,408 | 4/1989 | Aertker et al. | 114/144 E |
| 5,067,932 | 11/1991 | Edwards | 475/5 |
| 5,498,950 | 3/1996 | Ouwerkerk | 320/18 |

*Primary Examiner*—Ed L. Swinehart
*Attorney, Agent, or Firm*—Hazel & Thomas, P.C.

[57] ABSTRACT

An auxiliary propulsion system for a boat or other marine vessel according to the invention incorporates an electric motor/transmission device for generating locomotive force to propel the boat or vessel, an electrical power supply for providing electrical energy to drive the electric motor/transmission device, at least one electrical energy generating device for generating electrical energy through conversion from one of at least sunlight, wind motion and water motion, a charging circuit having a device for controlling charging of the power supply with electrical energy from the energy generating device, and a device for controlling speed and direction operation of the electric motor/transmission device. In operation, electrical energy is inputted into the electric motor/transmission device from the electrical power supply and locomotive force is thereby generated by the electric motor/transmission device when the primary propulsion system of the boat or other marine vessel is inactive. Electrical energy to be stored in the electrical power supply is generated by converting at least one of sunlight, wind motion and water motion into electrical energy.

21 Claims, 9 Drawing Sheets

METHOD AND APPARATUS FOR PROPELLING A MARINE VESSEL

BACKGROUND OF THE INVENTION

1. Field of the Invention

The present invention relates generally to a system for propelling marine vessels. In particular, the invention relates to an auxiliary propulsion system for sail-powered marine vessels that uses a combined electric motor and transmission device having a continuously variable speed output, a stored energy supply for powering the device, and an electrical recharging system for recharging the stored energy supply.

2. Description of the Prior Art

Traditionally, numerous types of marine vessels have relied on the use of sails as their primary source of motive energy. However, for safety reasons, the larger classes of sail-powered vessels are typically equipped with auxiliary power sources for use during low wind conditions or for maneuvering in and out of harbors and slips. Such auxiliary power sources typically consist of internal combustion engines or electrically powered motors. Both of these power sources have inherent disadvantages as will be discussed below.

Internal combustion engines require constant maintenance and often become environmental hazards after extended use or inadequate maintenance. For example, internal combustion engines require the use of oil-based fuels and lubricants that can leak and emit unpleasant, unsightly and unsafe odors. In addition, internal combustion engines are comparatively loud, and often can become unreliable due to age or constant exposure to the saltwater and extreme weather conditions common to the environment of marine vessels. The necessary fuel system and engine block are bulky and add unwanted weight to marine vessels. Finally, any supply of fuels and lubricants on a marine vessel can occupy a considerable amount of a vessel's limited space, and also pose a fire hazard to the vessel and its occupants.

On the other hand, electric motors used in marine vessels are generally quieter, less polluting and require less maintenance than internal combustion engines. However, electric motors also suffer from a number of inherent problems. Electric motors are usually powered by batteries which cannot operate for extended periods of time without recharging. During normal operation, marine vessels are often far from shore and do not have a recharging source. Large banks of batteries may be employed to prolong the amount of time between battery rechargings. However, like the fuel tanks, the engine block and the required supplies for an internal combustion engine, the large banks of batteries needed to run conventional electric motors can be bulky and heavy.

A need exists, therefore, for an auxiliary propulsion system for marine vessels that is comparatively lightweight and dependable, occupies less space than the conventional auxiliary propulsion system, can operate for extended periods of time, and is not absolutely dependent on land-based facilities for replenishment of its energy supply.

Marine vessels are operated in environments having almost unlimited energy sources. For example, as noted above, sail-powered marine vessels use the wind as their primary motive power source. However, in addition to the wind, such vessels are typically exposed to several hours of direct sunlight, and are surrounded by water that is constantly in motion. The movement of vessels under sail by itself can generate the movement of water. The wind, sun and water offer sources of energy which could potentially help power marine vessels.

Consequently, a further need exists for a propulsion system for marine vessels that can harness the energies of the wind, sun or water to a greater degree than is possible in current conventional marine vessels.

SUMMARY OF THE INVENTION

In view of the disadvantages and shortcomings present in the prior art, a general object of the present invention is to provide an apparatus and method for an auxiliary propulsion system for a sail-powered marine vessel.

A further general object is to provide an apparatus and method for an electrically-based auxiliary propulsion system for a sail-powered marine vessel.

Another general object is to provide an apparatus and method for recharging an electrically-based auxiliary propulsion system for a sail-powered marine vessel.

It is yet another object of the invention to provide an apparatus and method for an electrically-based auxiliary propulsion system for a sail-powered marine vessel that is comparatively lightweight, efficient and inexpensive.

An even further object of the invention is to provide an apparatus and method for an electrically-based auxiliary propulsion system for a sail-powered marine vessel that requires less room, or is at least more space efficient, than conventional auxiliary propulsion systems.

An even further object is to provide an apparatus and method for a propulsion system for marine vessels that can harness the energies of the wind, sun or water to a greater degree than current conventional marine vessels.

According to one aspect of the invention, the apparatus of the auxiliary propulsion system generally incorporates means for generating locomotive force to propel the boat or vessel wherein the locomotive means includes an electric motor/transmission device, means for storing energy for the electric motor/transmission device, and means for generating energy from one of at least sunlight, wind motion and water motion to be stored in the energy storing means.

According to a more specific aspect of the invention, the auxiliary propulsion system for a boat or other marine vessel incorporates an electric motor/transmission device for generating locomotive force to propel the boat or vessel; an electrical power supply for providing electrical energy to drive the electric motor/transmission device; at least one electrical energy generating device for generating electrical energy through conversion from one of at least sunlight, wind motion and water motion; a charging circuit having means for controlling charging of the power supply with electrical energy from the energy generating device; and means for controlling speed and direction operation of the electric motor/transmission device.

In a further aspect of the invention, a method for providing auxiliary propulsion for a boat or other marine vessel comprises the steps of providing an electric motor/transmission device; inputting electrical energy into the electric motor/transmission device from an electric power supply; generating locomotive force for the boat or other marine vessel using the electric motor/transmission device when a primary propulsion system of the boat or other marine vessel is inactive; and generating electrical energy to be stored in the electrical power supply. The step of generating electrical energy includes the step of converting at least one of sunlight, wind motion and water motion into electrical energy.

Other objects and features of the present invention will be apparent from the following detailed description of the preferred embodiments.

BRIEF DESCRIPTION OF THE DRAWINGS

The invention will be further described in conjunction with the accompanying drawings, in which.

DETAILED DESCRIPTION OF THE PREFERRED EMBODIMENTS

With reference to the figures, like reference characters will be used to indicate like elements throughout the several embodiments and views thereof. In particular, with reference to FIG. 1, the propulsion system 10 of the present invention is generally embodied in a variable speed electric motor/transmission 12 connected through a shaft to a propeller 14. The motor/transmission 12 is a dual-input, infinite-speed electrically powered motor/transmission device as disclosed in U.S. Pat. No. 5,067,932, which is incorporated herein by reference.

Figure 1:
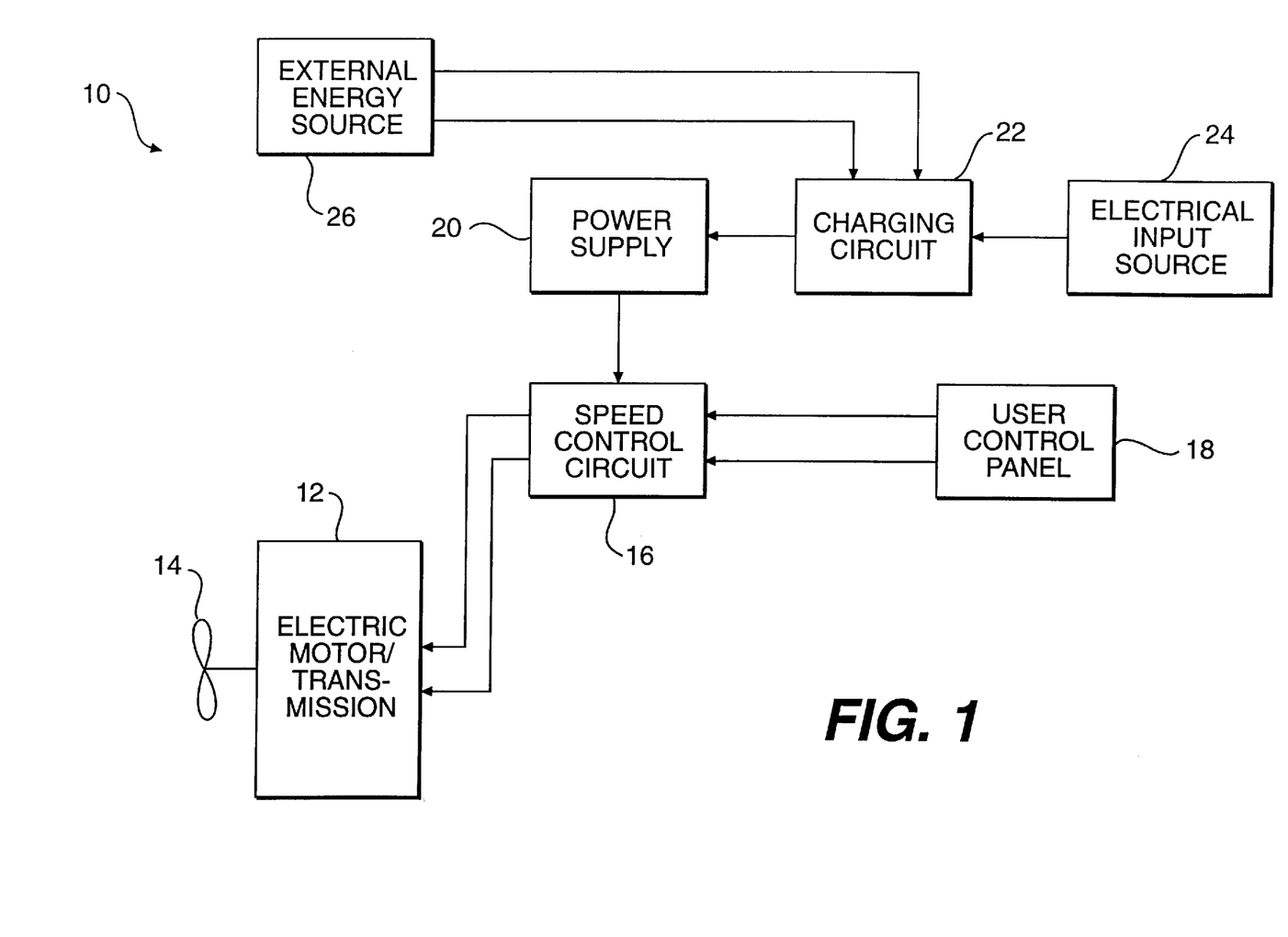
FIG. 1 illustrates a system block diagram of an electrically-based, rechargeable auxiliary propulsion system according to a general embodiment of the present invention.

As explained in U.S. Pat. No. 5,067,932, an electric motor/transmission, as applicable to the present invention, includes a sun gear motor powering a sun gear assembly, a ring gear motor powering a ring gear assembly and a transmission assembly. The ring gear assembly can be rotated in a forward or reverse direction at an infinite number of speeds. To alter the amount of torque delivered by the motor/transmission, the sun gear assembly may be rotated in a forward direction, a reverse direction or may be locked in a stationary position.

In operation, the electric motor/transmission 12 drives the propeller 14, thereby propelling the vessel (not shown) in which the system is installed. The direct connection from the electric motor/transmission 12 to the propeller allows substantially all of the torque developed by motor/transmission 12 to be transmitted directly to propeller 14.

The electric motor/transmission 12 is further connected to a speed control circuit 16 that varies the electrical power to the electric motor/transmission 12, thereby varying the speed of the electric motor/transmission 12 and the propeller 14. Consequently, varying the speed of the propeller varies the speed of the vessel. The speed control circuit 16 is connected to a user control panel 18. From the user control panel 18, the speed of the vessel or the amount of power to apply to the propulsion system 10, along with the direction of rotation of the propeller 14 to effect either forward or reverse motion can be selected.

The speed control circuit 16 controls the amount of electric power inputted to the electric motor/transmission 12 from the power supply circuit 20. Since a preferred embodiment of the present invention is primarily directed to be an auxiliary propulsion system for a sail-powered marine vessel, one conventional implementation of the power supply circuit 20 is a bank of batteries, such as car batteries. However, other types of high capacity electric storage cells may be used for the power supply circuit 20. For example, commercial versions of the battery cells used in modern diesel submarines may be applicable.

The speed control circuit 16 can be implemented using a conventional microprocessor-based control circuit (not shown) as known in the art, wherein user inputs (i.e., pushing of a button, shifting of a lever, rotating of a dial) into the user control panel 18 are translated into control signals. The control signals are then inputted into the speed control circuit 16. The control signals are then interpreted by the microprocessor-based circuit of the speed control circuit 16 to control the amount of electric power to be fed to the electric motor/transmission 12.

Figure 7:
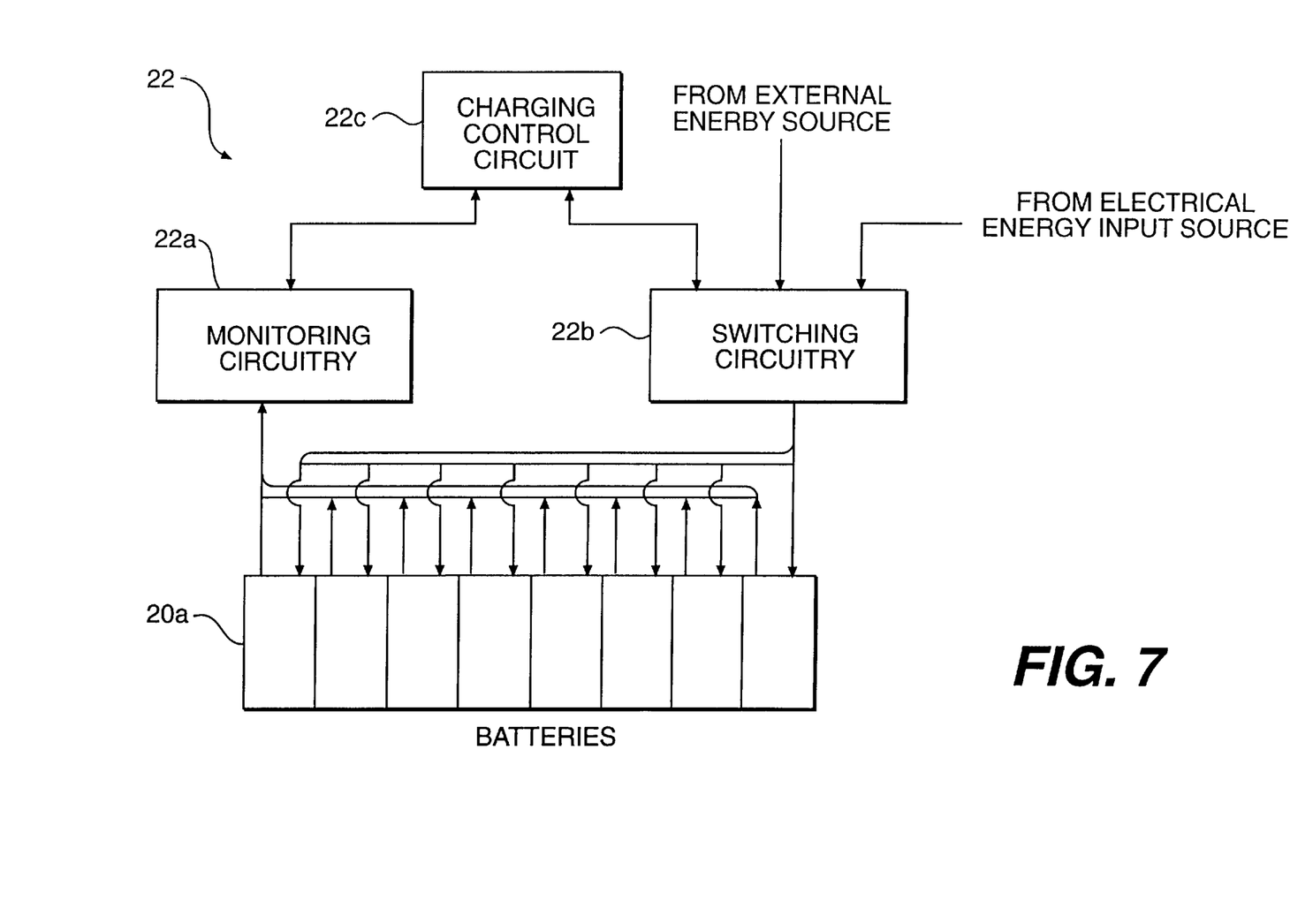
FIG. 7 shows a system block diagram of the circuit components of one embodiment for the charging circuit.

The power supply 20 is replenished with electrical energy through a charging circuit 22. The charging circuit 22 controls and regulates the voltage and current levels inputted into the system for recharging the power supply 20. In an embodiment of the invention where the power supply 20 consists of a bank of batteries, the charging circuit 22 as shown in FIG. 7 can include monitoring circuitry 22a for monitoring and signalling which batteries in a bank of batteries 20a need replenishment or replacement. Also, the charging circuit 22 can include switching circuitry 22b for selectively charging the batteries, in order to either evenly regulate the charging of the batteries or to charge only the batteries that require charging. A charging control circuit 22c is connected to receive and process signal data from the monitoring circuitry 22a and to control the switching and charging operation of the switching circuitry 22b.

Figure 4A:
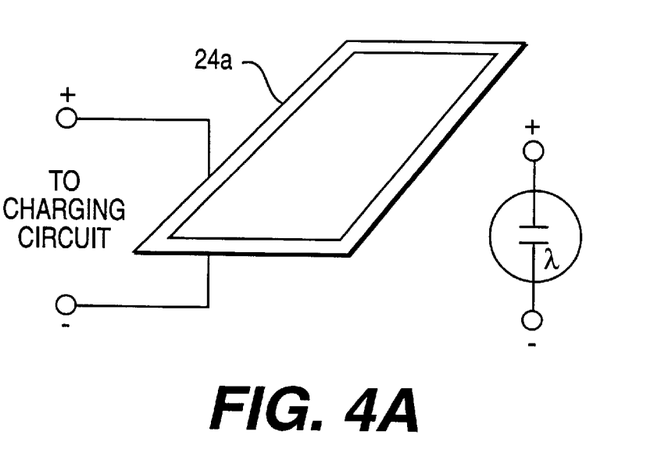
FIGS. 4A–4C illustrate examples of individual electrical energy generating sources and their accompanying structural connections to the charging circuit applicable to the preferred embodiment of the present invention.
Figure 4B:
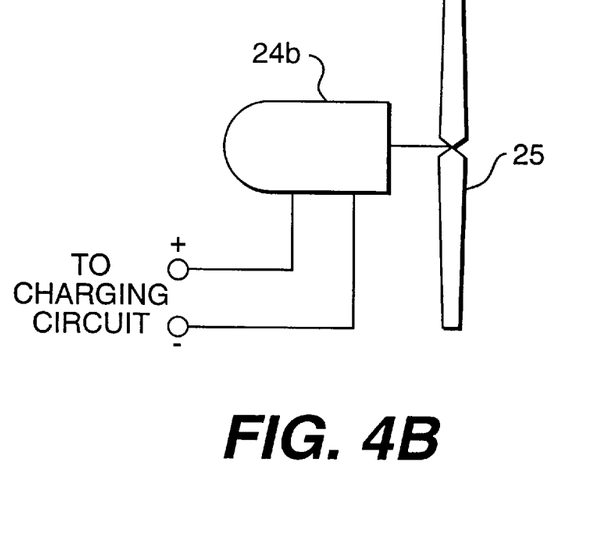
Figure 4C:
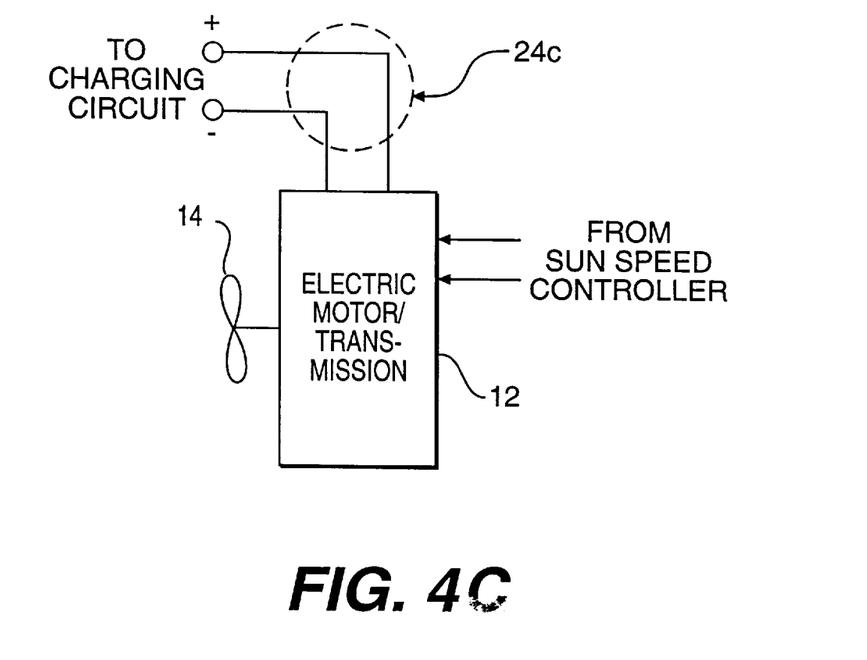

The charging circuit 22 is further connected to at least one electrical energy input source 24 and an external energy source 26. The electrical input source 24 is embodied in an electrical energy generating device or system that can generate electrical energy with which to charge the power supply 20 while the boat/vessel is moving under sail or even while it is stationary away from the docks. In the preferred embodiment of the invention, such electrical energy generating devices include, as shown in FIGS. 4A through 4C, solar panels composed of an array of photoelectric cells (FIG. 4A), wind-powered generators (FIG. 4B), and water- or wave-powered generators (FIG. 4C). As shown in FIG. 4B, one example of a wind-powered generator is a windmill-type device consisting of an electrical generator 24b with a propeller 25 that rotates with the wind.

In the preferred embodiment of the present invention, the water- or wave-powered generator incorporates the electric motor/transmission 12 that is coupled to a regenerative feedback circuit 24c and its accompanying circuitry (not shown). This wave-powered generator operates while the boat/vessel is moving under sail. As the boat/vessel moves, the movement of the boat/vessel through the water forces water passing underneath the boat or vessel to move through the propeller 14 that is idle when the electric motor/transmission 12 is not operating. The direct connection between the propeller and the electric motor/transmission 12 causes the movement of the water to rotate the propeller 14 and the electric motor/transmission 12, thereby operating the electric motor/transmission 12 as an electric generator, opposite its normal operation as an electric motor. As will be further explained and illustrated hereinafter, the electrical energy generated by the electric motor/transmission 12 is is fed through the regenerative feedback loop 24c to the power supply 20.

The external energy source 26 may be embodied by any conventional power supply or generator system external to the power supply 20 and the various types of electric input sources 24. For example, one type of external energy source is the conventional 115-volt heavy-duty outlet available at typical docks and ports. Another example is the conventional gasoline-powered generator which can either be located at a dock or be carried on the boat/vessel.

Figure 2:
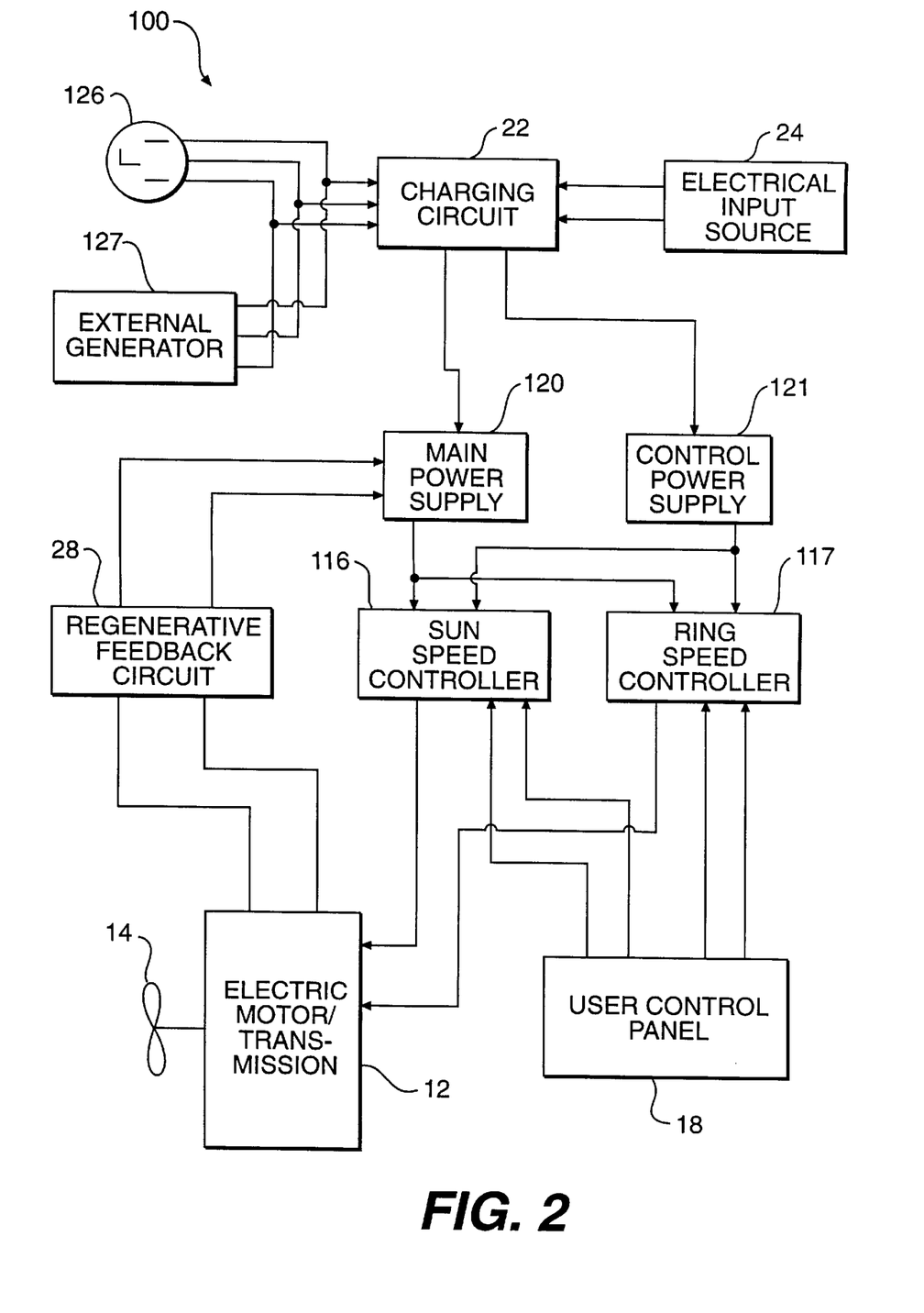
FIG. 2 illustrates a block diagram of an electrically-based, rechargeable auxiliary propulsion system according to a preferred embodiment of the present invention.

In a more detailed embodiment of the present invention, as illustrated in FIG. 2, the speed control circuit 16 is embodied in a sun speed controller 116 and a ring speed controller 117. The operation of each of these controllers is determined by the inputs generated through the user control panel 18. As noted above, the electric motor/transmission 12 includes a sun gear motor powering a sun gear assembly; a ring gear motor powering a ring gear assembly; and a transmission assembly (all not shown). The sun speed controller 116 controls the electrical energy fed to the sun gear motor, thereby controlling the speed and torque of the sun gear motor and its corresponding sun gear assembly. The ring speed controller 117, on the other hand, controls the electrical energy fed to the ring gear motor, thereby controlling the speed and torque of the ring gear motor and its corresponding ring gear and transmission assemblies.

The power supply 20 is embodied in a main power supply 120 that supplies the electrical energy for operating the sun and ring gear motors of the electric motor/transmission, and a control power supply 121 that powers the sun and ring gear controllers 116, 117.

The charging circuit 22 is configured to receive and regulate electrical energy from not only the electrical input source 24, but also from a conventional 115 volt heavy-duty outlet 126 and an external generator 127 (i.e., a gasoline-powered generator). Further, the charging circuit 22 regulates the electrical energy inputted into each of the main and control power supplies 120, 121 for recharging them.

In a separate circuit, the electric motor/transmission 12 is connected to the main power supply 120 through a regenerative feedback circuit 28 that includes the regenerative feedback loop 24c shown in FIG. 4C. The regenerative feedback circuit 28 receives electrical energy from the electric motor/transmission 12 when it operates as a generator (as explained above), and feeds that energy to recharge the main power supply 120 directly.

Like the charging circuit 22 shown in FIG. 7, the regenerative feedback circuit 28 in one embodiment (not shown) can incorporate monitoring circuitry for monitoring and signalling which batteries in a bank of batteries need replenishment or replacement, and switching circuitry for selectively charging the batteries, in order to either evenly regulate the charging of the batteries or to charge only the batteries that require charging.

Figure 3:
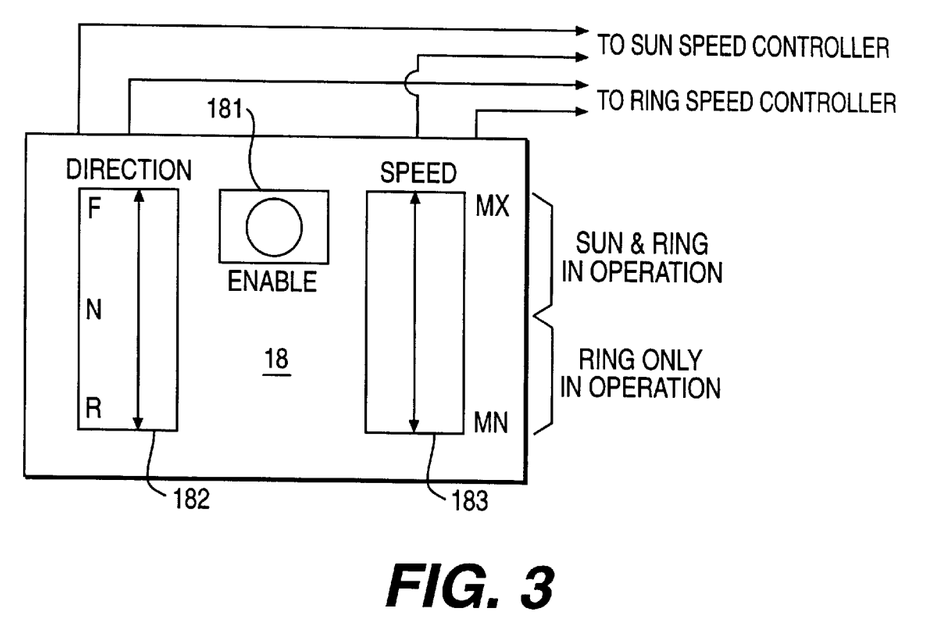
FIG. 3 illustrates one example of a general arrangement for the structure and operation of the user control panel according to the present invention.

As shown in FIG. 3, one embodiment for the user control panel 18, in accordance with the system of the present invention shown in FIG. 2, comprises an ENABLE switch 181, a direction control device 182, and a speed control device 183. The physical implementation of all three devices would be embodied in the use of switches and variable input level devices as known in the art. For example, ENABLE switch 181 may be embodied in a conventional momentary contact switch, while the direction control device 182 and the speed control device 183 may be embodied in conventional variable position levers. Both the direction control device 182 and the speed control device 183 are connected to send corresponding control signals to the sun speed controller 116 and to the ring speed controller 117.

In the functional implementation of the invention as shown in FIG. 2, the ENABLE switch 181 controls activation of the user control panel 18, for example, by controlling the connection to the control power supply 121. When the user control panel 18 is active, the direction control device 182 outputs direction control signals to both the sun speed controller 116 and the ring speed controller 117 determining whether the electric motor/transmission 12 will operate and propel the boat/vessel in a forward (setting F) or reverse (setting R) direction, or remain in an idle or neutral (setting N) state.

The speed control device 183 outputs speed control signals to the sun speed controller 116 and the ring speed controller 117, determining the speed and torque output levels of the sun gear motor and the ring gear motor. As illustrated in FIG. 3, the speed control device 183 is structured to vary between maximum (setting MAX) and minimum (setting MIN) output levels of the motors, and to output speed control signals corresponding to a selected output level. One technique for implementing the speed control device 183, as well as the direction control device 182, involves the use of a microprocessor-controlled circuit (not shown) as known in the art. The positions of the two control devices are translated by the microprocessor-controlled circuit into the corresponding direction and speed control signals. Those direction and speed control signals are then inputted into the sun speed controller 116 and the ring speed controller 117. The sun speed controller 116 and the ring speed controller 117 in turn use the control signals to regulate the electric energy fed to the electric motor/transmission 12.

An alternative technique for implementing the direction and speed control devices 182, 183 involves structuring the control devices to output analog or digital signals indicative of their respective positions (i.e., F versus R, MAX versus MIN). The outputted signals from the control devices are then inputted into each of the sun speed controller 116 and the ring speed controller 117. In this implementation, both the sun speed controller 116 and the ring speed controller 117 are implemented using microprocessor-controlled circuits (not shown). The sun speed controller 116 and the ring speed controller 117 translate the outputted signals from the user control panel 18, and respectively regulate the operation of the electric motor/transmission 12.

A further alternative technique for implementing the direction and speed control devices 182, 183 of the user control panel 18, as well as the sun speed and ring speed controllers 116, 117, involves the use of microprocessor-controlled circuits in the user control panel 18 and in each of the sun speed and ring speed controllers 116, 117. In each of the above-described techniques, the structure and operation of the microprocessor-controlled circuit is in accordance with conventional controller circuits used in similar applications as known in the art.

In operation, to move the boat/vessel forward, for example, the direction control device 182 is set in the "forward" position (setting F) while speed control device 183 is positioned at a relatively low setting (i.e., at or near setting MIN). In this configuration, the direction control device signals the sun speed controller 116 to configure the electric motor/transmission 12 with the sun gear assembly locked rigidly in place, while allowing the ring gear assembly to be rotated in the desired direction to propel the boat/vessel forward.

Simultaneously, the speed control device 183 communicates with the ring speed controller 117 to direct the electric motor/transmission 12 to rotate the ring gear assembly at a relatively slow rotational velocity. In this manner, motor transmission 12 delivers a minimum amount of torque to the propeller 14, thereby rotating the propeller 14 at a relatively slow rotational velocity.

To propel the boat/vessel at higher velocities, the propeller 14 must be rotated at a higher rotational velocity and the electric motor/transmission 12 must produce a greater amount of torque. To do so, speed control device 183 is set at or near a midway point between the maximum output (setting MAX) and minimum output or idle settings (setting MIN), thereby directing the sun speed controller 116 to rotate the sun gear assembly in a direction identical to the ring gear assembly's direction. The sun gear assembly rotates at a rotational velocity less than ring gear assembly's rotational speed when the speed control device 183 is positioned between the midway position and the maximum output setting (MAX). As a result, the electric motor/transmission 12 produces more torque than when the sun gear assembly is rigidly fixed, thereby propelling the boat/vessel faster.

The boat/vessel is propelled forward at a maximum speed when the electric motor/transmission 12 delivers a maximum amount of torque to the propeller 14. Maximum torque is produced when the speed control device 183 is positioned at the maximum setting (MAX). At that setting the speed control device 183 directs the sun speed controller 116 to rotate the sun gear assembly in the same direction and at the same rotational velocity as the ring gear assembly.

To propel the boat/vessel in the reverse direction, the direction control device 182 is positioned in the reverse setting (R). The sun speed controller 116 and the ring speed controller 117 direct the electric motor/transmission 12 to rotate the sun gear assembly and ring gear assembly in directions opposite to those discussed above. The speed of the boat's/vessel's rearward movement is controlled in the same fashion as that discussed above.

Further, the direction control device 182 can be set at the "neutral" position (setting N) at which propeller 14 is not being rotated in either direction by the sun gear motor or the ring gear motor. In this position, sun gear motor and ring gear motor remain coupled with the propeller 14, whereby rotation of the propeller 14 due to the movement of the water will operate the electric motor/transmission as a generator. Consequently, electric energy generated by the electric motor/transmission 12 will be fed through the regenerative feedback circuit 28 to recharge the main power supply.

Figure 5:
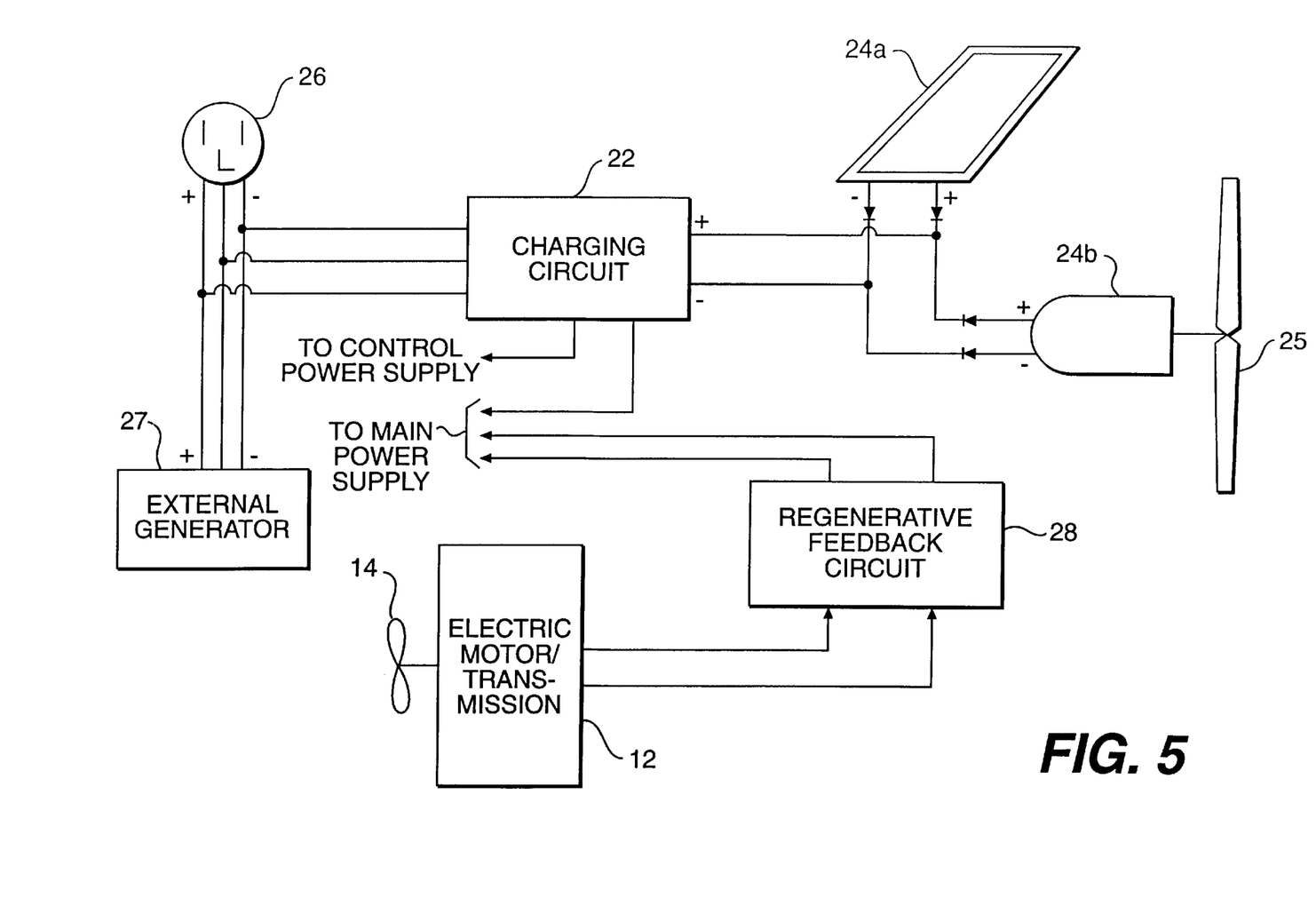
FIG. 5 shows one example of a general system block diagram for implementing the use of several electrical energy generating sources together connected to the charging circuit of the preferred embodiment of the present invention.

As shown in FIG. 5, the electrical input source 24 (See FIGS. 1 and 2) can be embodied in more than a single type of electrical energy generating system. Here, for example, the electrical input source 24 consists of a solar panel 24a connected and operating in parallel with a wind-powered generator 24b. Also, a regenerative feedback circuit embodying a water- or wave-powered generator 24c can be included. In accordance with the embodiment illustrated in FIG. 2, the regenerative feedback circuit 28 is connected directly to the main power supply 120, since the regenerative feedback circuit 28 can include, as noted above, monitoring circuitry for monitoring and signalling which batteries in a bank of batteries need replenishment or replacement, and switching circuitry for selectively charging the batteries. When the charging circuit 22 and the regenerative feedback circuit 28 are designed as independent circuits, as illustrated in FIG. 5, a manual switching circuit (not shown) can be incorporated that allows a user to select which of the two circuits will regenerate the main power supply 120.

Figure 6:
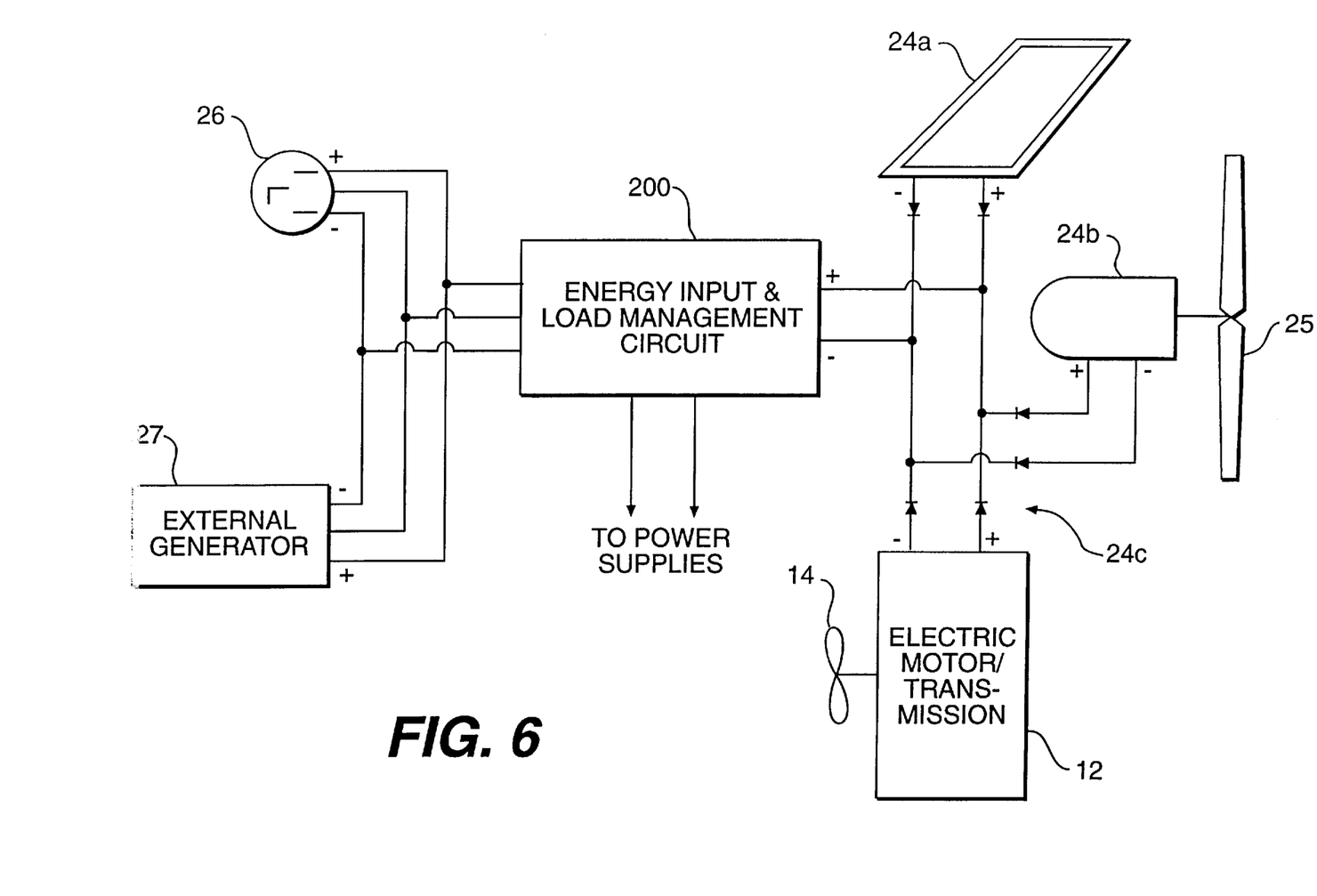
FIG. 6 shows a second example of a general system block diagram for implementing the use of several electrical energy generating sources together connected to an energy input and load management circuit applicable to the preferred embodiment of the present invention.

Alternatively, a system as shown in FIG. 6 may be used where an energy input and load management circuit 200 is used to control the regenerating of the main power supply 120 and the control power supply 121. In essence, the load management circuit 200 incorporates the functions of the charging circuit 22 and the regenerative feedback circuit together.

Figure 8:
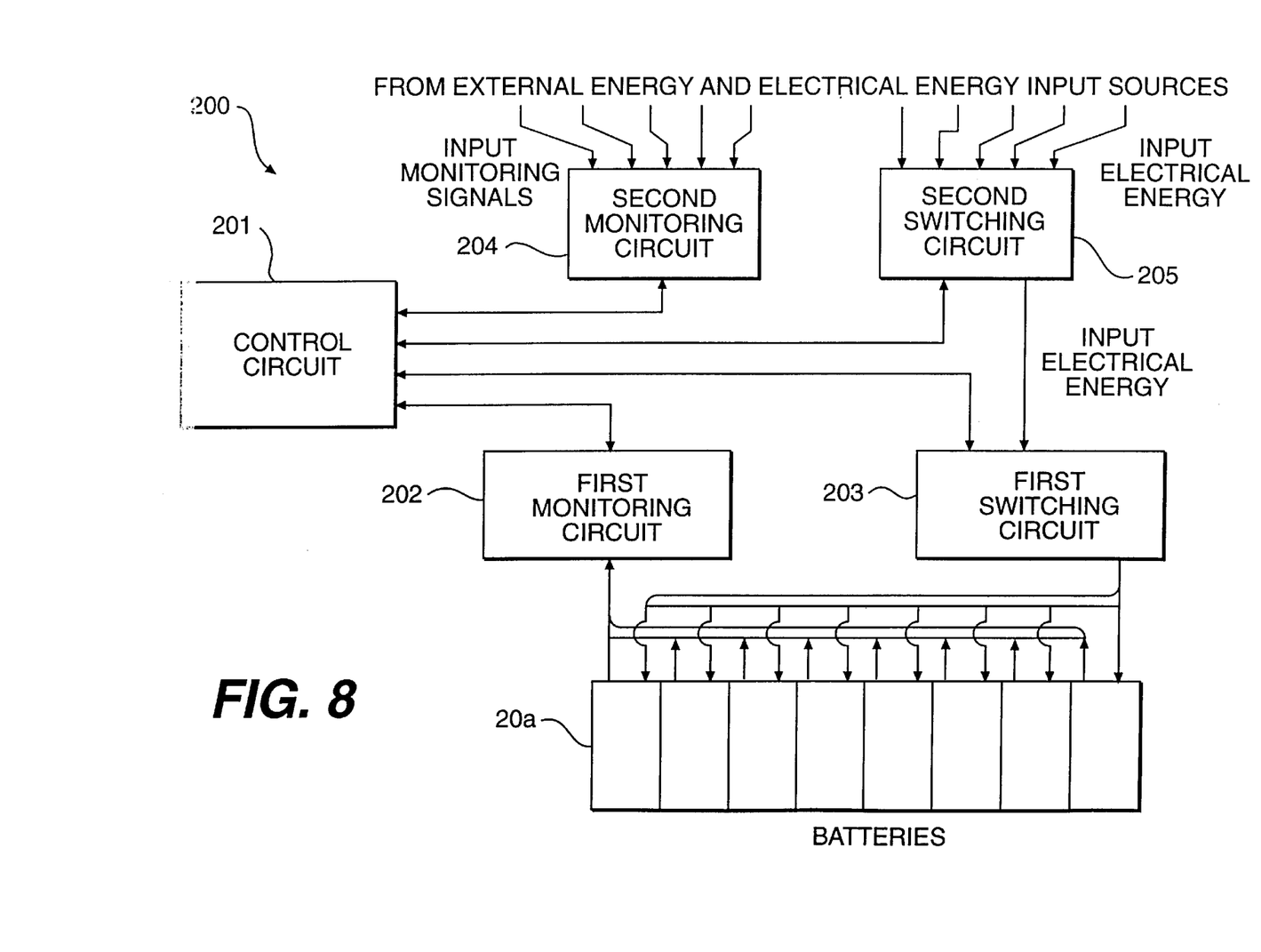
FIG. 8 illustrates a general system block diagram of the components implementing the energy input and load management circuit applicable to the circuit of FIG. 6.

As shown in FIG. 8, one embodiment of the load management circuit 200 includes a control circuit 201, a first monitoring circuit 202 for monitoring and signalling which batteries in a bank of batteries 20a need replenishment or replacement, a first switching circuit 203 for selectively charging the batteries, a second monitoring circuit 204 for monitoring which of the energy input devices is inputting or is capable of inputting energy, and a second switching circuit 205 for switching between energy input devices. The control circuit 201 is a microprocessor-based device that controls the operation of the other circuits.

In operation, the first monitoring circuit 202 monitors which batteries in a bank of batteries need replenishment or replacement, and signals the control circuit 201 accordingly. The second monitoring circuit 204 monitors which of the energy input devices can provide energy. For example, the second monitoring circuit 204 detects which of the solar panel 24a (i.e., if there is available sunlight), the wind-powered generator 24b (i.e., sufficiently strong air currents are rotating the windmill-type device 25), or the electric motor/transmission 12 (i.e., when the electric motor/transmission 12 is not being used as a motor) is generating electrical energy. The second monitoring circuit 204 can also detect whether the system is connected to an external energy source (i.e., a 115-volt outlet at a dock), or to an external generator 27. The second monitoring circuit 204 then signals the control circuit 201 as to which energy input devices and other energy sources are available.

The first switching circuit 203 is controlled by the control circuit 201 and selectively switches between the energy storage cells in the main and control power supplies 120, 121. For example, with a bank of batteries, the first switching circuit 203 selectively connects with the batteries that need recharging. In one variation of the energy input and load management circuit 200, the first monitoring circuit 202 measures the energy levels of the individual batteries, and the control circuit 201 uses those measurements to determine the order and priority for recharging or to determine and thereby indicate which of the batteries needs replacement.

The second switching circuit 205 is also controlled by the control circuit 201 and selectively switches between the different energy input devices and energy sources as they become available, get connected or disconnected or diminish in providing energy. For example, while the boat/vessel is anchored offshore, the energy input and load management circuit 200 can be recharging the power supplies 120, 121. If sunlight is available, the solar panel 24a automatically generates electricity. The second monitoring circuit 204 detects the presence of electrical energy, and the second switching circuit 205, under control of the control circuit 201, routes the energy accordingly to the first switching circuit 203 to recharge the power supplies 120, 121. If cloud cover develops, thereby diminishing the sunlight, but the offshore winds start to pick up, the second monitoring 204 detects the changes in the energy input devices. The control circuit 201 then controls the second switching circuit 205 to switch routing energy from the solar panel 24a to routing energy from the wind-powered generator 24b.

As a consequence, the energy input and load management circuit 200 maximizes the usage of the different energy input devices and maintains the power supplies 120, 121 at optimum operational levels.

Figure 9:
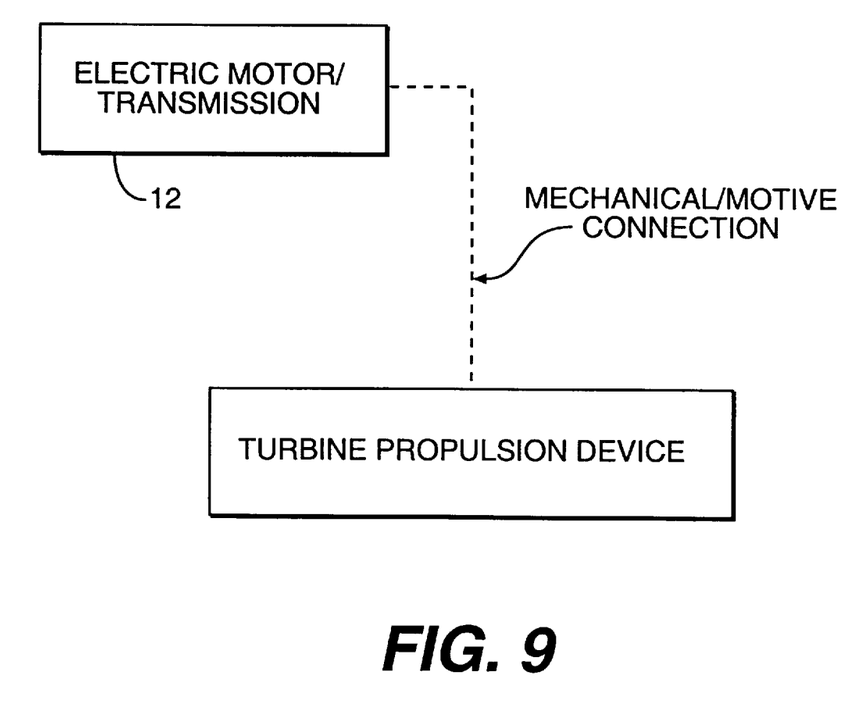
FIG. 9 illustrates the structure for a turbine device known in the art for use in marine vessel propulsion as applied to the present invention for providing locomotion.

Although the present invention has been fully described in connection with the preferred embodiment thereof with reference to the accompanying drawings, it is to be noted that various changes and modifications are apparent to those skilled in the art. For example, the auxiliary propulsion system of the present invention can be used as the primary propulsion system for a boat, ship or vessel with little or no modification from the embodiments disclosed above. In addition, instead of a conventional propeller 14, the electric motor/transmission can be connected to a turbine (see FIG. 9), a paddlewheel or other similar device that can provide locomotion through water, while being usable as a generator when water is forced to flow through it. These and other changes and modifications are to be understood as included within the scope of the present invention as defined by the appended claims, unless they depart therefrom.

What is claimed is:

1. A propulsion system for a boat or other marine vessel, said system being able to use at least one of sunlight, wind motion and water motion as an energy source, comprising:
   means for generating locomotive force to propel said boat or vessel, said locomotive means including a dual-input, variable speed electric motor/transmission device, said electric motor/transmission device having a sun gear assembly, a sun gear motor powering said sun gear assembly, a ring gear assembly, a ring gear motor powering said ring gear assembly and a transmission assembly operatively connected between said sun gear and ring gear assemblies so as to input and output locomotive force with said sun gear and ring gear assemblies;
   means for storing energy for said electric motor/transmission device; and
   means for generating energy from said energy source to be stored in said energy storing means.

2. An auxiliary propulsion system for a boat or other marine vessel, said system being able to use at least one of sunlight, wind motion and water motion as an energy source, comprising:
   a dual-input, variable speed electric motor/transmission device for generating locomotive force to propel said boat or vessel, said electric motor/transmission device having a sun gear assembly, a sun gear motor powering said sun gear assembly, a ring gear assembly, a ring gear motor powering said ring gear assembly and a transmission assembly operatively connected between said sun gear and ring gear assemblies so as to input and output locomotive force with said sun gear and ring gear assemblies;
   an electrical power supply for providing electrical energy to drive said electric motor/transmission device, said power supply being operatively connected to said electric motor/transmission device;
   at least one electrical energy generating device for generating electrical energy through conversion of energy from said energy source; and
   a charging circuit operatively connected between said power supply and said energy generating device, said charging circuit having means for controlling charging of said power supply with electrical energy from said energy generating device.

3. An auxiliary propulsion system for a boat or other marine vessel according to claim 2, wherein said an electric motor/transmission device includes a water propulsion element for propelling said boat or vessel.

4. An auxiliary propulsion system for a boat or other marine vessel according to claim 3, wherein said water propulsion element for propelling said boat or vessel comprises a propeller.

5. An auxiliary propulsion system for a boat or other marine vessel according to claim 3, wherein said water propulsion element for propelling said boat or vessel comprises a turbine.

6. An auxiliary propulsion system for a boat or other marine vessel according to claim 2, wherein said electrical power supply comprises a first power supply for supplying power to said electric motor/transmission device, and a second power supply for supplying power to said control means.

7. An auxiliary propulsion system for a boat or other marine vessel according to claim 6, wherein said electrical power supply includes rechargeable electric storage cells for each of said first and second power supplies.

8. An auxiliary propulsion system for a boat or other marine vessel according to claim 2, wherein said at least one electrical energy generating device for generating electrical energy comprises solar panels of photoelectric cells connected to said charging circuit.

9. An auxiliary propulsion system for a boat or other marine vessel according to claim 2, wherein said at least one electrical energy generating device for generating electrical energy comprises a wind-power generator connected to said charging circuit.

10. An auxiliary propulsion system for a boat or other marine vessel according to claim 9, characterized in that said wind-power generator includes a windmill device.

11. An auxiliary propulsion system for a boat or other marine vessel according to claim 2, wherein said at least one electrical energy generating device for generating electrical energy comprises a regenerative feedback circuit connected to said charging circuit and to said electric motor/transmission device, said feedback circuit including means for generating electrical energy from water motion through said electric motor/transmission device when said electric motor/transmission device is inactive in generating locomotive force.

12. An auxiliary propulsion system for a boat or other marine vessel according to claim 2, wherein said at least one electrical energy generating device for generating electrical energy comprises solar panels of photoelectric cells, a wind-power generator and a regenerative feedback circuit all connected to said charging circuit, wherein said regenerative feedback circuit is further connected to said electric motor/ transmission device, and includes means for generating electrical energy from water motion through said electric motor/transmission device when said electric motor/ transmission device is inactive in generating locomotive force.

13. An auxiliary propulsion system for a boat or other marine vessel according to claim 2, further comprising means for controlling speed and direction operation of said electric motor/transmission device.

14. An auxiliary propulsion system for a boat or other marine vessel according to claim 13, wherein said means for controlling speed and direction operation of said electric motor/transmission device includes a user control panel.

15. A method for providing auxiliary propulsion for a boat or other marine vessel, said method being able to use at least one of sunlight, wind motion and water motion as an energy source, said method comprising the steps of:

provinding a dual-input, variable speed electric motor/ transmission device, said step of providing said electric motor/transmission device includes providing said device with a sun gear assembly, a sun gear motor powering the sun gear assembly, a ring gear assembly, a ring gear motor powering the ring gear assembly and a transmission assembly operatively connected between the sun gear and ring gear assemblies so as to input and output locomotive force with the sun gear and ring gear assemblies;

inputting electrical energy into said electric motor/ transmission device from an electric power supply;

generating locomotive force for said boat or other marine vessel using said electric motor/transmission device when a primary propulsion system of said boat or other marine vessel is inactive; and generating electrical energy to be stored in said electrical power supply, said step of generating electrical energy including the step of converting energy from said energy source into electrical energy.

16. A method for providing auxiliary propulsion for a boat or other marine vessel according to claim 15, wherein said step of generating electrical energy includes the steps of providing a solar panel of photoelectric cells, and converting sunlight into electrical energy.

17. A method for providing auxiliary propulsion for a boat or other marine vessel according to claim 15, wherein said step of generating electrical energy includes the steps of providing a wind-powered generator, and converting wind motion into electrical energy.

18. A method for providing auxiliary propulsion for a boat or other marine vessel according to claim 17, characterized in that said step of providing a wind-powered generator includes providing a windmill device.

19. A method for providing auxiliary propulsion for a boat or other marine vessel according to claim 15, wherein said step of generating electrical energy includes the steps of providing a regenerative feedback circuit connected to said electric motor/transmission device, and converting water motion into electrical energy through said electric motor/ transmission device when said electric motor/transmission device is inactive in providing locomotive force.

20. A method for providing auxiliary propulsion for a boat or other marine vessel according to claim 15, wherein said step of generating electrical energy includes the steps of providing a plurality of electrical energy generating devices for converting at least one of sunlight, wind motion and water motion.

21. A method for providing auxiliary propulsion for a boat or other marine vessel according to claim 15, wherein said step of providing a plurality of electrical energy generating devices includes the steps of providing a solar panel of photoelectric cells, providing a wind-powered generator, and providing a regenerative feedback circuit connected to said electric motor/transmission device.

* * * * *